United States Patent [19]
Munyon

[11] Patent Number: 5,973,607
[45] Date of Patent: Oct. 26, 1999

[54] HAND-HELD PROGRAMMABLE SIGN

[76] Inventor: Timothy Munyon, P.O. Box 556, Orinda, Calif. 94563

[21] Appl. No.: 09/027,632

[22] Filed: Feb. 23, 1998

[51] Int. Cl.[6] .................................. G08B 5/00; G09G 5/00
[52] U.S. Cl. ................. 340/815.4; 340/321; 340/815.45; 345/168; 341/22; 40/586
[58] Field of Search ........................... 340/815.4, 815.45, 340/815.47, 525, 321, 479; 345/168, 905; 341/22; 40/446, 541, 584, 586, 612

[56] References Cited

U.S. PATENT DOCUMENTS

| | | | |
|---|---|---|---|
| 3,750,138 | 7/1973 | Burgan et al. | 340/332 |
| 4,534,012 | 8/1985 | Yokozawa | 364/143 |
| 4,928,084 | 5/1990 | Reiser | 340/479 |
| 5,283,595 | 2/1994 | Krukovsky | 40/606 |

*Primary Examiner*—Donnie L. Crosland
*Attorney, Agent, or Firm*—Edward Callahan

[57] ABSTRACT

A portable programmable sign comprising a unitary T-shaped housing having opposed front and rear sides and including an upper sign portion and a lower hand-held portion mounted midway transverse to the sign portion. A keyboard system with a miniaturized keyboard processor including keys marked with indicia for letters of the alphabet, numerals, and other selected indicia is mounted on the hand grip for operator input. Operating keys are also mounted on the keyboard. The sign includes a miniaturized computer microprocessor for processing input data received from the keyboard. A miniaturized light-emitting message display, preferably an LED display, is mounted on the front side of the sign portion for reading by an observer. An electrical circuit in the housing joins the keyboard system, computer microprocessor, and the light-emitting message display are joined by an electrical circuit in the housing and which can be internally or externally powered. An optional miniaturized monitor display system mounted on the rear side of the sign portion receives the input data from the computer microprocessor prior to transmission of the input data so that a user can edit or verify the accuracy of the input data prior to transmission of the data to the light-emitting message display.

48 Claims, 12 Drawing Sheets

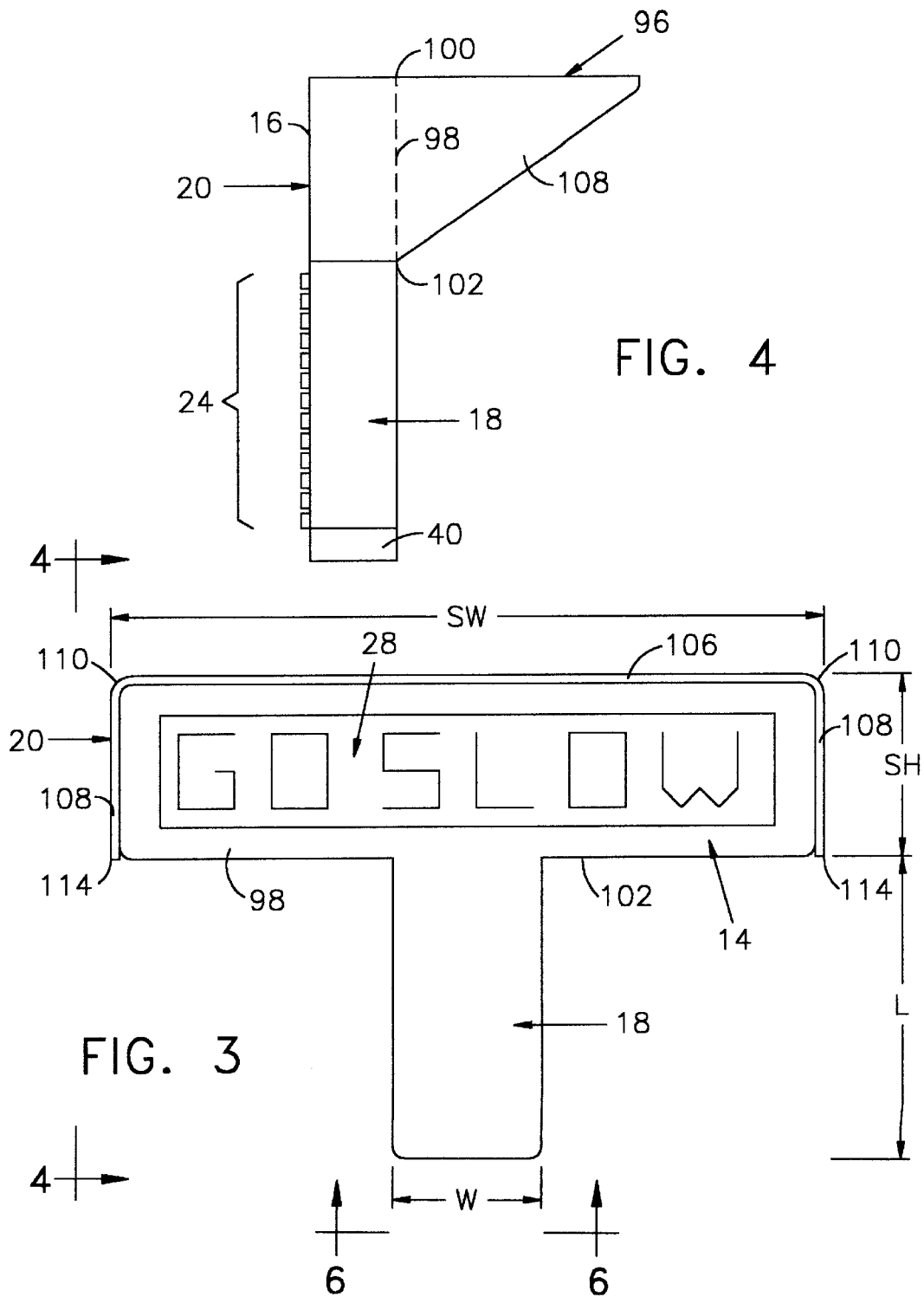

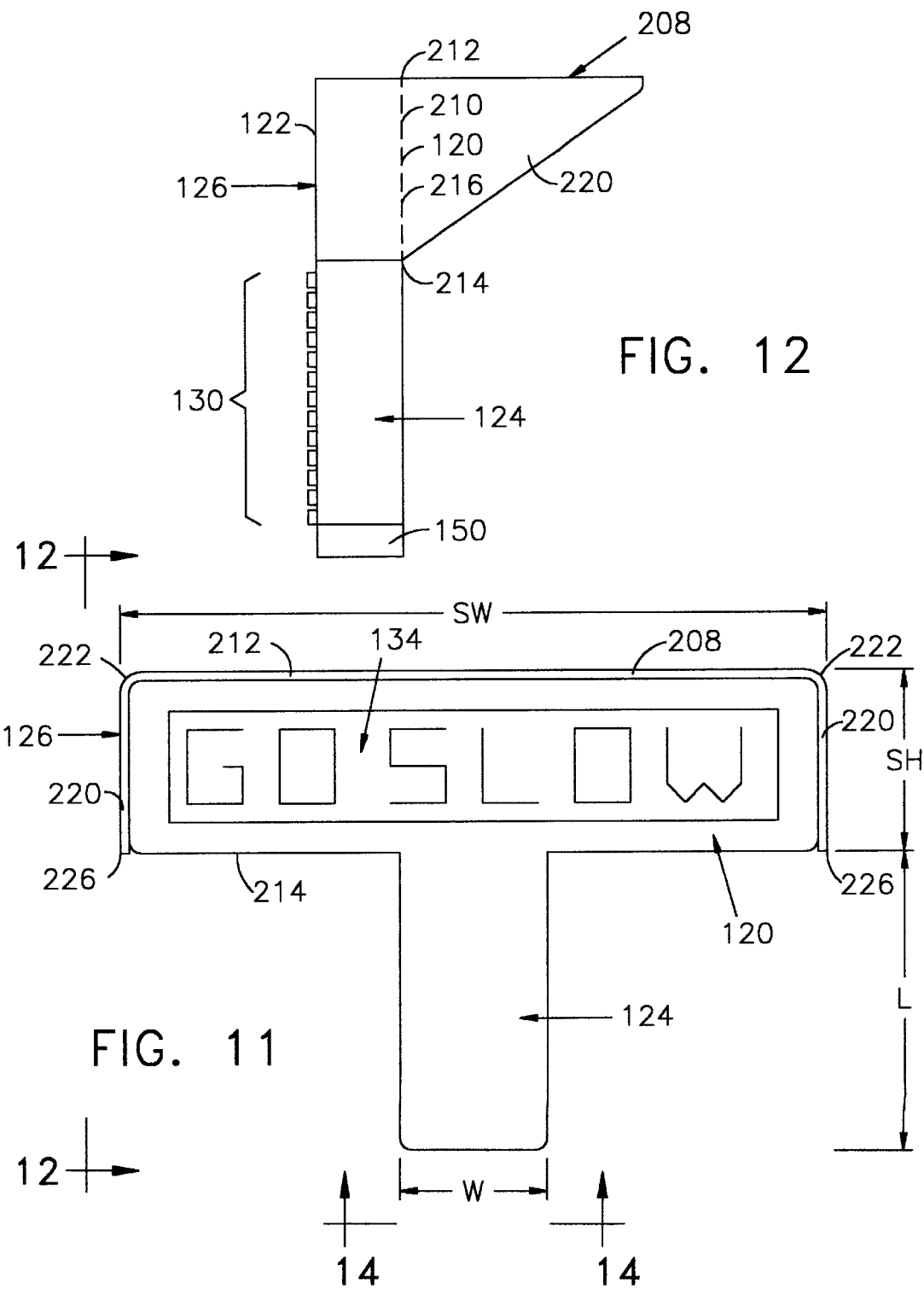

HAND-HELD PROGRAMMABLE SIGN

FIELD OF THE INVENTION

This invention relates to the fields of signs and microprocessors and in particular to a combination thereof.

BACKGROUND OF THE INVENTION

Messages are called for in many situations where speech cannot be used or can be used only with difficulty. A few examples are as follows: areas where noise levels are very high; areas where silence is preferred or in zero noise areas, such as in the military, during test taking or during church services; construction areas such as high buildings or in sewers where the voice cannot be heard clearly; boat to boat communications; and between swimmers or between a swimmer and a boat in underwater activity.

Computers have not been associated with portable, or hand-held, sign technology partly because monitor viewing screens are dominated by the fluorescent screen associated with the cathode ray tube (CRT) technology, which has until recently been bulky. Miniaturized microprocessor technology has recently allowed reduction of CRT monitors with displays that are as crisp and readable as laser printing on paper.

Computer display technology is presently used with displays that are based upon the well-known liquid crystal display (LCD), such as are used for messages displayed on the screens of bank cash vending machines. LCDs could be used in operative association with miniaturized microprocessor technology.

The same miniaturized technology has reduced motherboard processors so that an entire package including display and microprocessor is reduced to fit into a shirt pocket, that is to say, to the rectangular dimensions of a credit card. Such advances in miniaturized microprocessor technology can be applied as well to keyboard processors.

SUMMARY OF THE INVENTION

It is therefore the object of the present invention to provide a sign that is both small and light enough to be easily hand-held and that encloses a complete computer including a keyboard with miniaturized keyboard microprocessor, a miniaturized computer microprocessor, and an LED screen with a miniaturized monitor microprocessor, so that a variety of messages can be input, or programmed, into the computer by a user and instantly be displayed and read by a message receiver, or obvserver.

It is also an object of the present invention to provide a sign that is both small and light enough to be easily hand-held and that encloses a complete computer including a keyboard with miniaturized keyboard microprocessor, a miniaturized computer microprocessor, a large message display with a miniaturized monitor microprocessor, and a small LCD display monitor with miniaturized LCD microprocessor for proofreading and editing of messages prior to sending of messages at a full screen LED message display.

In accordance with these and other objects that will become apparent in the course of this disclosure, there is provided a portable programmable sign comprising a unitary T-shaped housing having opposed front and rear sides and including an upper sign portion and a lower sign portion mounted midway transverse to the sign portion. A keyboard system with a miniaturized processor including keys marked with indicia for letters of the alphabet and other selected indicia are mounted on the hand-grip portion. Control keys are also mounted on the keyboard. The sign includes a miniaturized computer microprocessor for processing input data received from the keyboard. A miniaturized light-emitting message display system presents the input data to a distant observer by way of a light-emitting display, preferably an LED display mounted on the front side of the sign portion. An electrical circuit in the housing joins the keyboard system, the miniaturized computer microprocessor, and the LED message display, which can be internally or externally powered. In another embodiment of the invention a miniaturized monitor display system mounted on the rear side of the sign portion receives input data from the computer microprocessor prior to transmission of the input data so that a user can edit or verify the accuracy of the input data prior to transmission of the data to the LED message display.

Other embodiments or modifications may be suggested to those having the benefit of the teachings therein, and such other embodiments or modifications are intended to be reserved especially as they fall within the scope and spirit of the subjoined claims.

BRIEF DESCRIPTION OF THE DRAWINGS

FIG. 3 is a frontal view of the sign shown in FIG. 1 with a message displayed on an LED display;

FIG. 4 is a side elevation view taken through line 4—4 in FIG. 3;

FIG. 11 is a frontal view of the sign shown in FIG. 9 with a message displayed on a screen thereon;

FIG. 12 is a side elevation view taken through line 12—12 in FIG. 11;

DESCRIPTION OF THE PREFERRED EMBODIMENT

Figure 1:
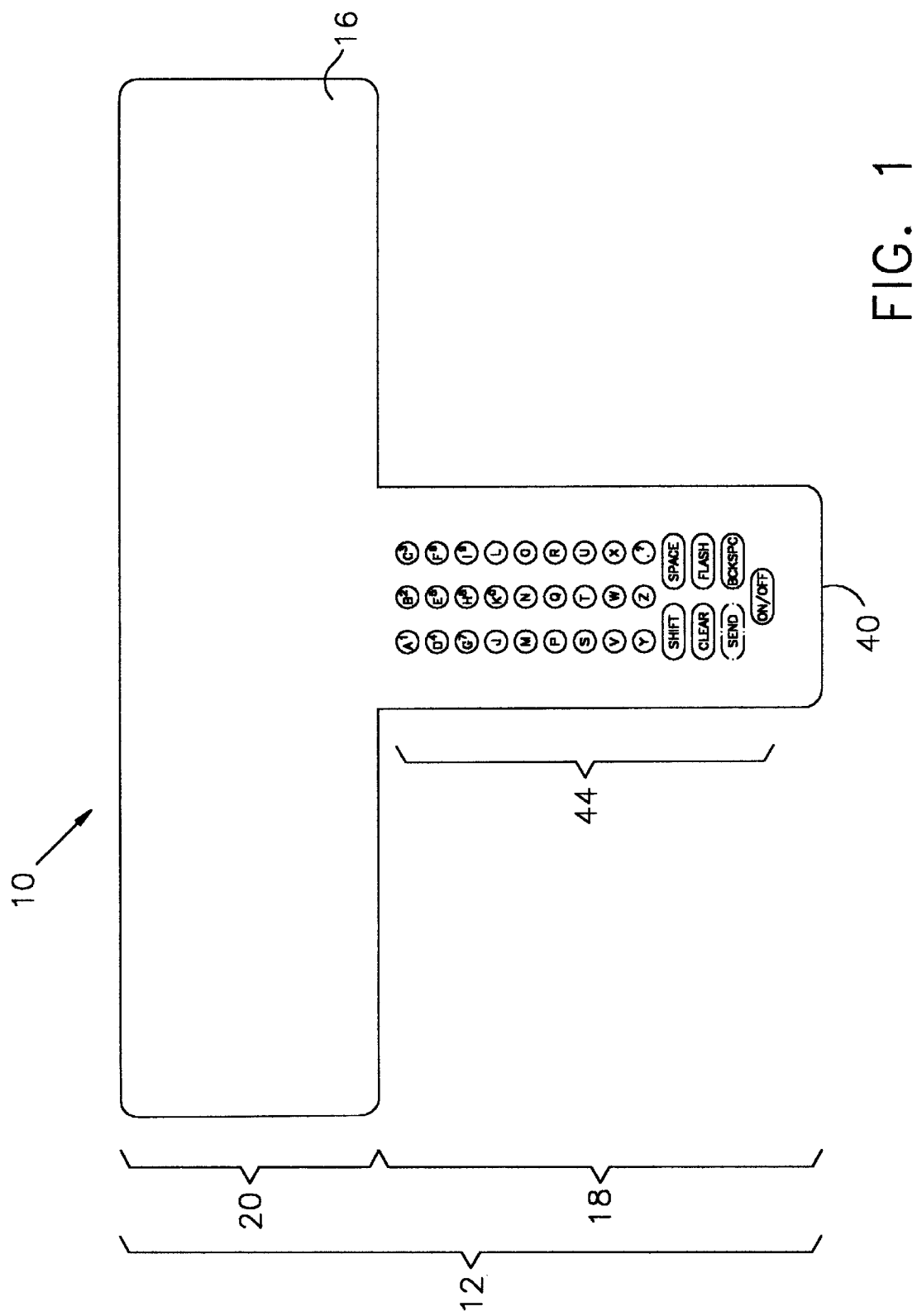
FIG. 1 is a rear view of a hand-held programmable sign in accordance with the present invention.

Reference is now made in detail to the drawings wherein the same numerals refer to the same or similar elements throughout.

A portable programmable sign 10 shown in FIGS. 1–8 includes a housing 12 having opposed front and rear sides 14 and 16, respectively, and a lower hand-grip portion 18 which is mounted transverse to an upper sign portion 20. As shown in FIG. 4, hand-grip portion 18 has a length L that is approximately 5 inches at a right angle to sign portion 20 and a width W that is approximately 2⅜ inches. Sign portion 20 has a sign width SW that is approximately 12 inches at right angles to hand-grip portion 18 and a sign height SH that is approximately 3 inches.

Figure 7:
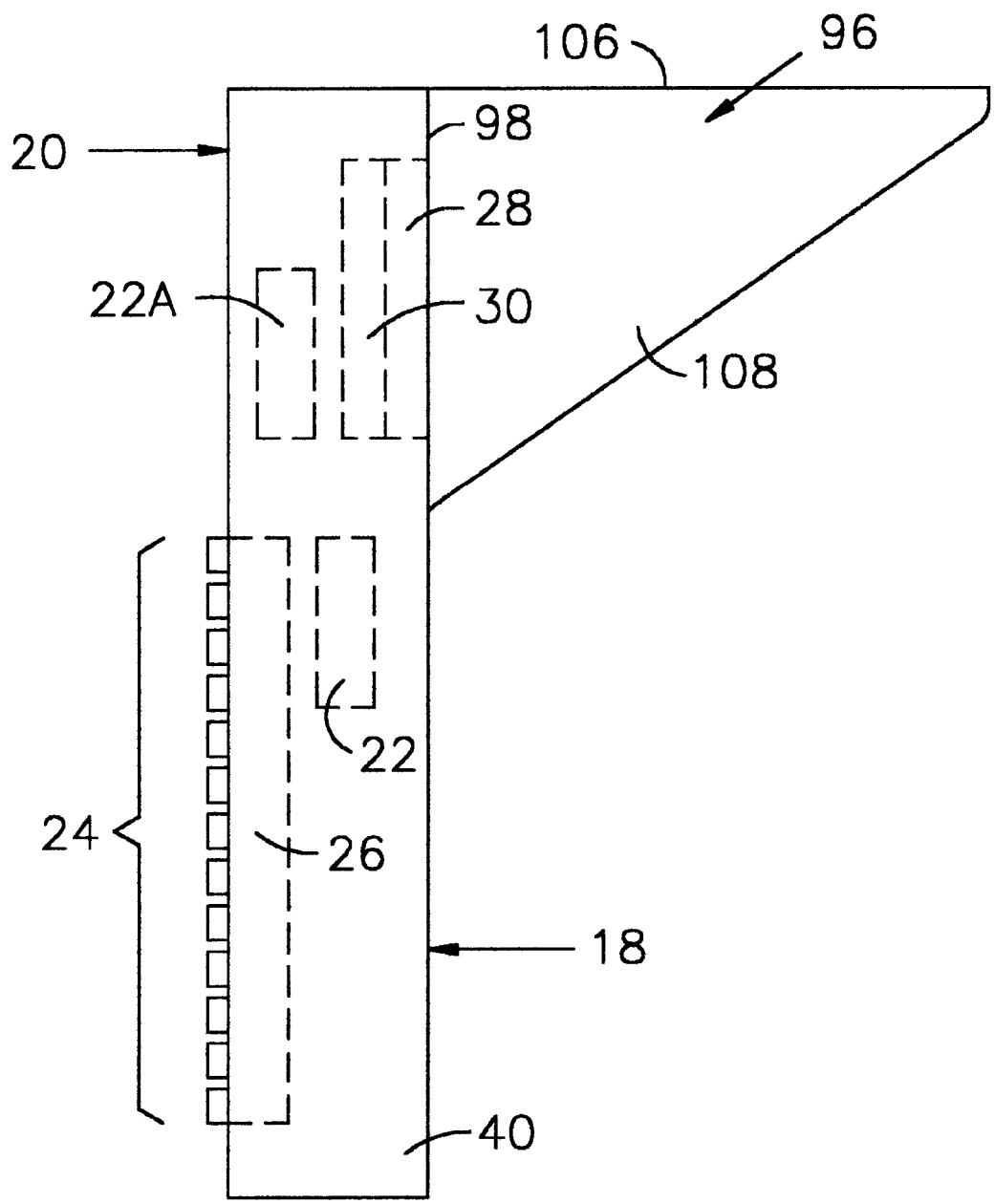
FIG. 7 is a side view of the hand-held sign in a side view analogous to the view of FIG. 4 with the keyboard processor, the computer microprocessor, and the LED processor and display generally indicated in dashed line and also showing a light shield for the LED display.

A miniaturized computer microprocessor 22 for processing data indicated in dashed line in FIG. 7 is mounted within housing 12, in particular in hand-grip portion 18. Alternatively, a computer miniaturized microprocessor shown as computer miniaturized microprocessor 22A can be mounted in sign portion 20 as indicated in phantom line. As shown in FIG. 7, a keyboard 24 is mounted on rear side 16 of hand-grip portion 18 and a miniaturized keyboard microprocessor 26 operatively connected with keyboard 24 is mounted within hand-grip portion 18. Keyboard microprocessor 26 receives input data from keyboard 24 and transmits the data to computer microprocessor 26. Keyboard 24 is preferably slightly smaller than a standard keyboard.

Figure 5:
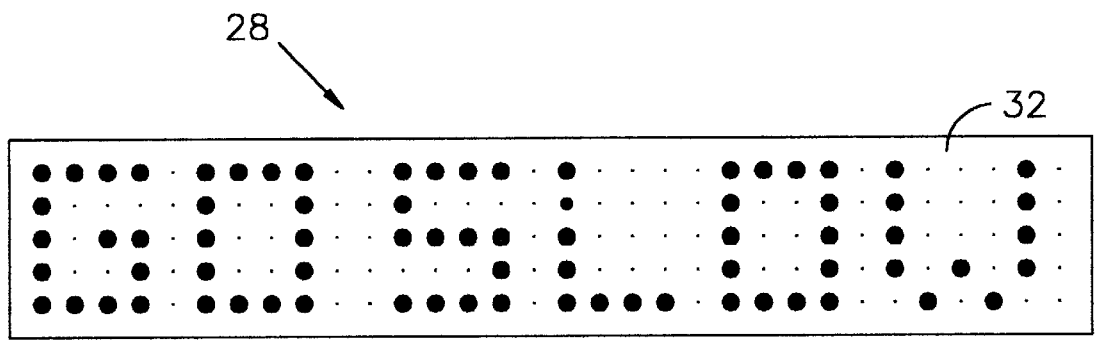
FIG. 5 is a view taken in isolation of the message display in FIG. 3 with indication of both activated and inactive light-emitting diodes (LEDs)
Figure 6:
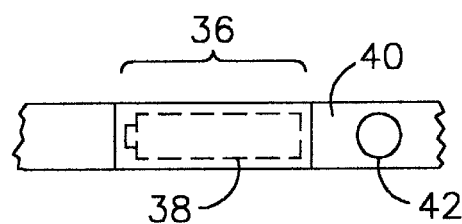
FIG. 6 is a view of the bottom side of the sign handle taken through line 6—6 in FIG. 3 showing internal and external power sources.

A light-emitting message display 28 shown in FIGS. 3 and 7 presents the data entered at keyboard 24 in visual form to observers. Message display 28 is mounted on front side 14 of sign portion 20. A miniaturized message display microprocessor 30 mounted in sign portion 20 as indicated in dashed line in FIG. 7 converts the input data received from computer microprocessor 22 for entry at message display 28. Message display 28 is preferably a light-emitting diode (LED) display 32 that transmits the color red. LED display 32 shown in FIG. 5 is presented on a 5×32 diode screen but such a configuration is shown for purposes of exposition only and will change in accordance with circumstances. A message 33 "GO SLOW" is shown by way of example as one of a number of possible messages. The screen size of LED display 32 is slightly smaller than the 12 inch by 3 inch dimensions of sign portion 20, which may be increased or decreased somewhat in accordance with circumstances and ease of handling sign 10 by a user. The actual size of LED display 32 varies in accordance with distances envisioned between the observer and sign 10 and environmental conditions such as night or day or whether the message is to be passed through a medium such as water, for example. LED display 32 is meant to be read by an observer positioned at a distance from sign 10 with the actual maximum distance desired varying in accordance with purpose and conditions anticipated. The actual dimensions of LED display 32 therefor can vary somewhat within the spirit of the invention.

Figure 8:
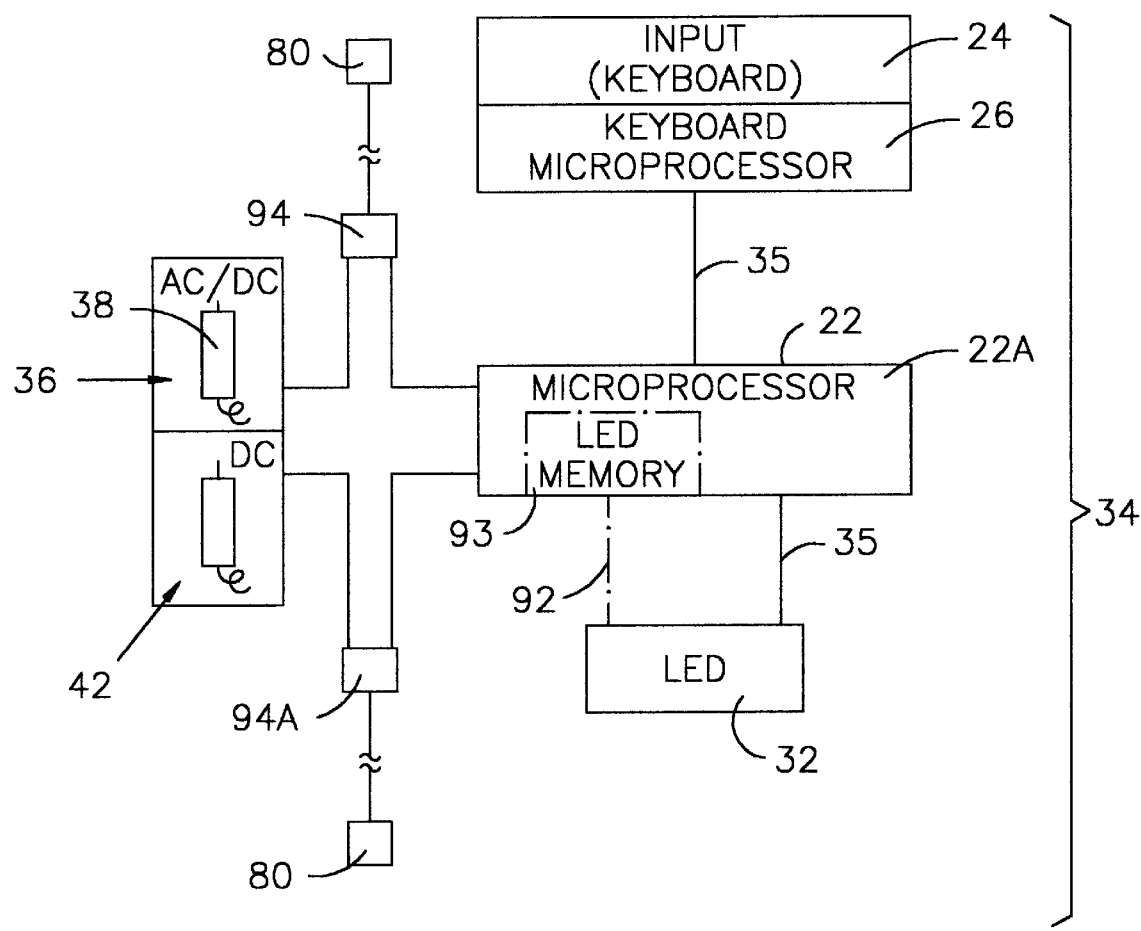
FIG. 8 is a simplified electrical diagram of the keyboard processor, the LED display, and the power supply.

As shown in FIG. 8, an electrical circuit 34 joins keyboard 24 and keyboard microprocessor 26 with computer microprocessor 22. Display microprocessor 30 and LED display 32 are also shown in FIG. 8. A circuit line 35 is indicated between computer microprocessor 22 and LED message display 32. A self-contained internal power source 36 comprising two batteries 38 supplies electrical current to circuit 34 is mounted at the base 40 of hand-grip portion 18. Alternatively, an external power source indicated as a power connector 42 that includes an AC/DC converter positioned in base 40 can be utilized by connection to an external power line (not shown).

Figure 2:
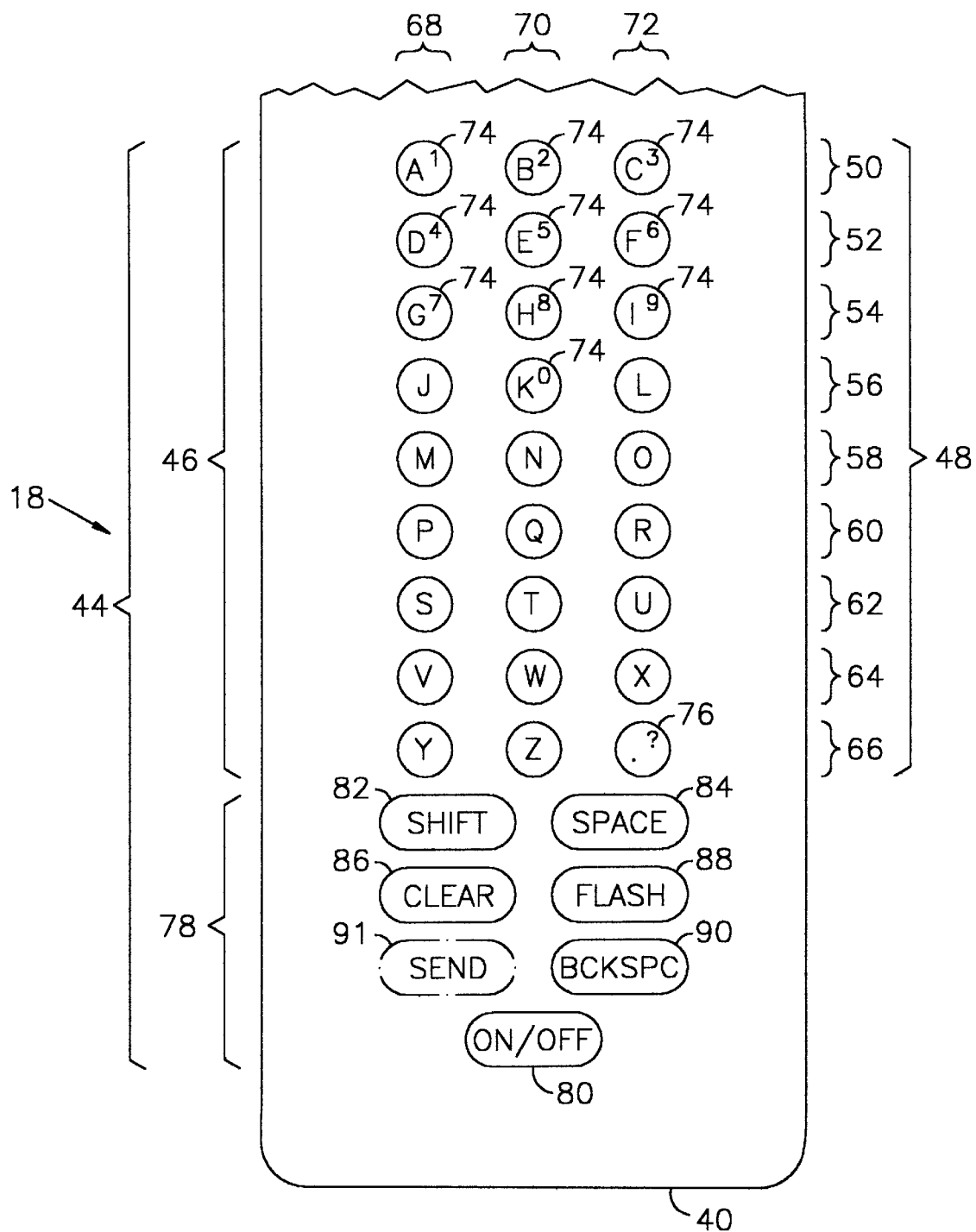
FIG. 2 is a view in isolation of the handle portion of the sign including a keyboard.

As best seen in FIG. 2, keyboard 24 includes an assemblage of systematically arranged keys 44 that are preferably slightly reduced in size than the standard keys on keyboards but still sized to receive finger tips for keystroke operation. Keys 44 are marked with indicia 46 representing the letters of the alphabet, ten numerals 0, 1, 2, 3, 4, 5, 6, 7, 8, and 9, and two grammatical signs, namely, a period and a question mark, all arranged in nine rows 48, specifically first row 50, second row 52, third row 54, fourth row 56, fifth row 58, sixth row 60, seventh row 62, eighth row 64, and ninth row 66 indicated from top to bottom sequence. Indicia 46 are also arranged in three files, namely first file 68, second file 70, and third file 72 indicated in left to right sequence. Files 68, 70, and 72 are oriented in parallel with length L of hand-grip portion 18. Indicia 46 of keys 44 are arranged with the commonly used sequence of letters of the alphabet, namely, A, B, C, D, E, F, G, H, I, J, K, L, M, N, O, P, Q, R, S, T, U, V, W, X, Y, Z, from top first row 50, first file 70 to the left marked with the letter A, and first row 50, second, or middle, file 70 marked with the letter B, and first row 50, third file from the left 72 marked with the letter C, and second row 52, first file 68 to the left marked with the letter D, and so on in sequence with the ninth row 66, third file 72 from the left being devoid of alphabetic indicia. Indicia 46 for ten basic numerals 0 through 9 are marked on certain keys 44 selected for dual alphabetic indicia and numeral indicia as follows: A, B, C, D, E, F, G, H, I, K, which are each additionally marked with numerical indicia 72, namely, 1, 2, 3, 4, 5, 6, 7, 8, 9, 0, respectively. Indicia 46 on keys 44 further include one grammatical key 76 that at ninth row 66, third file 72 and marked with both a period and a question mark.

The arrangement of keys 44 are shown and described relative to FIGS. 1 and 2 in a three-column and a nine-row configuration ordered in accordance with the standard order of the English alphabet. Such a configuration is presented merely for purposes of exposition. For example, the arrangement of keys 44 and indicia 46 can alternately be in accordance with the traditional arrangement of keys and indicia on standard computer keyboards with length L of hand-grip portion 18 serving as the viewing and operating base. Additional indicia representing grammatical and other signs can likewise be added in the spirit of the invention.

Keyboard 24 includes a set of six control keys 78 positioned below key row 66. Control keys 78 include an on/off key 80, a shift key 82, a space key 84, a clear key 86, a flash key 88, and a backspace (indicated as "bckspc") key 90. An optional send key 92 shown in phantom line is also positioned with control keys 78.

On/off key 80 is mechanically connected either to a mechanical open/closed switch 94 or a mechanical open/closed switch 94A, respectively, each of which is schematically set forth in FIG. 8. Open/closed switch 94 is movable between an open position and a closed position, wherein in the closed position switch 94 mechanically connects circuit 34 with internal power source 36, specifically batteries 38, and wherein in the open position circuit 34 is disconnected from internal power source 36. Alternatively, open/close switch 94A is movable between an closed position and an open position, wherein in the closed position open/closed switch 94A mechanically connects circuit 34 with external power connector 42, and wherein in the open position circuit 34 is disconnected from external power connector 42. Open/closed switches 94 and 94A are of a suitable type known in the art of switches, for example, biasably operated or other analogous types of mechanical switches. Operation of on/off key 80 serves to place circuit 34 in an electrically activate or inactivate mode.

Operation by a keystroke of shift key 82 activates all of ten combined alphabet-numeral keys between an alphabet mode and a numeral mode and operatively activates the combined grammatical symbols key 76 between the period mode and the question mark. Shift key 82 is operatively connected to keyboard microprocessor 26 for transmittal to computer microprocessor 22 for either a selected alphabetic indicia or a selected numeral of a selected combined alphabet-numeral key or for transmittal for either one of a pair of grammatical symbols as selected by a user.

Operation of space key 84 by a keystroke signals computer microprocessor 22 to transmit an electrical signal to display 28 to omit a space before the next key operation on keyboard 24.

Operation of clear key 86 by a keystroke signals computer microprocessor 22 to transmit an electrical signal to message display microprocessor 30 to remove all data from display screen 28.

Operation of flash key 88 by a keystroke signals computer microprocessor 22 to transmit an electrical signal to LED message display 28 to cause data being displayed on LED message display 28 to blink between light-emitting and non-light emitting modes.

Operation of backspace key 90 by a keystroke signals computer microprocessor 22 to transmit an electrical signal to LED message display 28 to remove data of one space.

An optional memory chip 93, designated herein as LED memory 93, associated with computer microprocessor 22 stores input data signaled from keyboard 24 and releases the input data stored therein upon a signal received from keyboard 24 by a keystroke operation of an optional seventh control key, namely, send key 91, for transmission by way of a circuit line 92, shown in phantom line in FIG. 8, from LED memory 93 to message display 32 for display. LED memory 93 includes an electronic memory chip switch transistor operable between on and off modes, wherein in the off mode the input data is stored in LED memory 93 and in the on mode the input data is released from LED memory 93 and transmitted for display at message display 32. The switch transistor of LED memory 93 returns by default to the off mode upon release of the input data.

A glare shield 96 connected to sign portion 20 of housing 12 shown in FIGS. 4, 5, and 7 reduces rays from external light from reaching and interfering with light emission from light-emitting message display 28. As seen in FIGS. 4, 5, and 7, sign portion 20 has a rectangular front wall 98 with opposed front wall upper and lower edges 100 and 102, respectively, and opposed front wall side edges 104. Glare shield 96 includes a rectangular shield top plate 106 transverse to and secured to front wall upper edge 100 and a pair of opposed triangular side plates 108 transverse to top plate 106 and secured to front wall side edges 104. Side plates 108 have side plate linear top edges 110 secured to shield top plate 106 and side plate linear side edges 112 secured to and coextensive with front wall side edges 104. Side plate bottom points 114 are secured to front wall lower edge 102.

Figure 9:
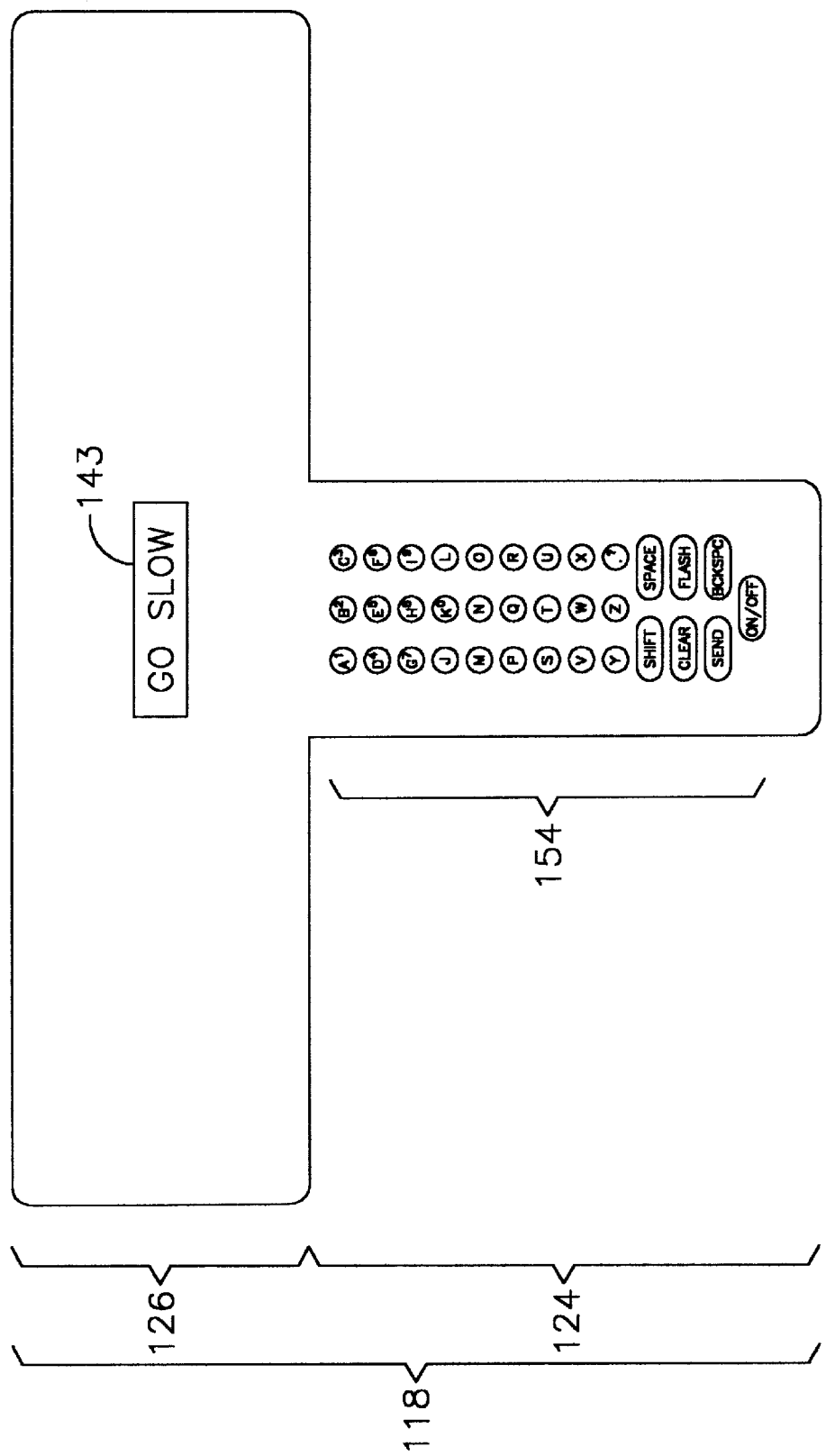
FIG. 9 is a rear view of another embodiment of the hand-held programmable sign in accordance with the present invention.
Figure 15:
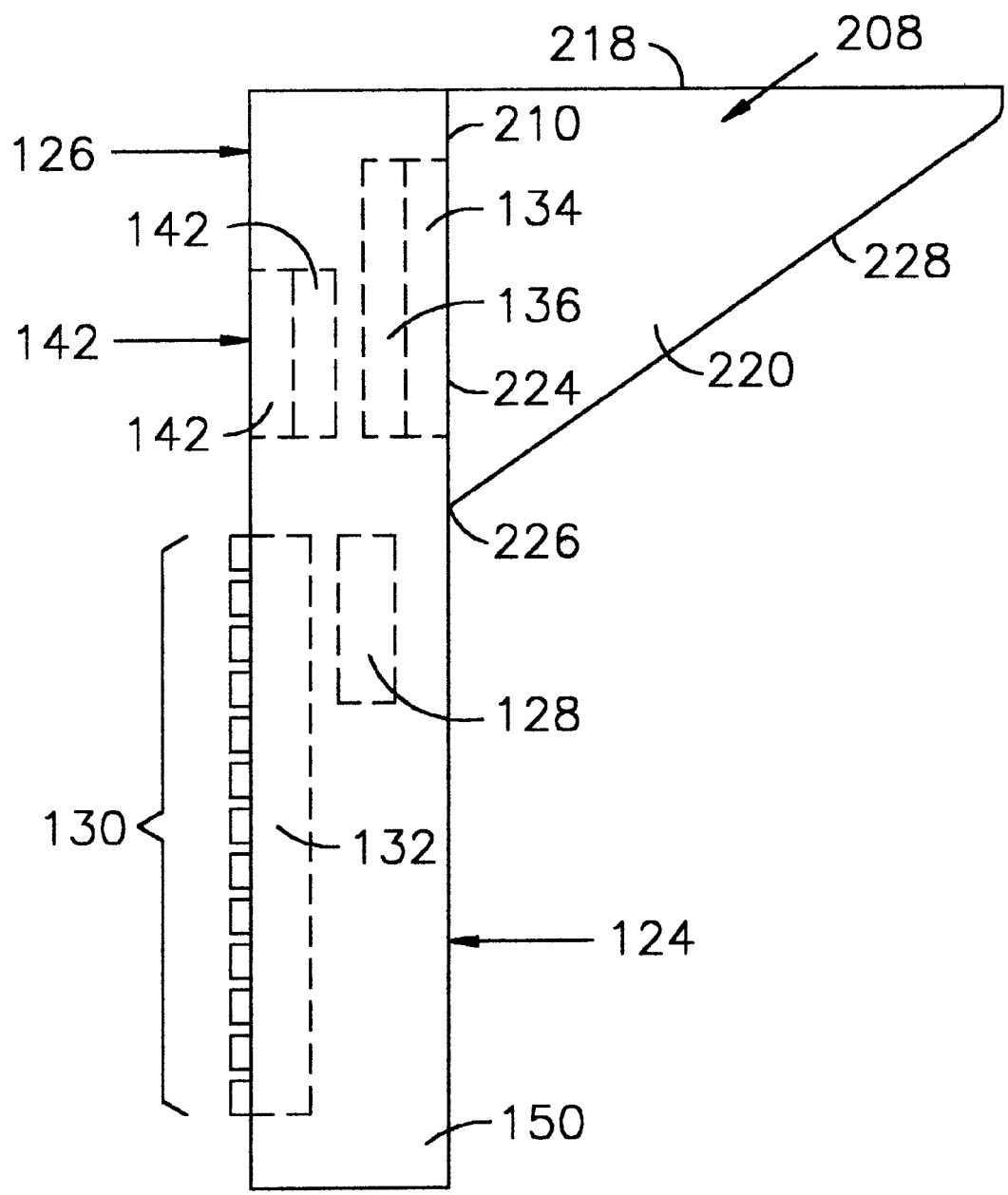
FIG. 15 is a side view of the hand-held sign in a side view analogous to the view of FIG. 12 with the positions of the keyboard microprocessor, the computer microprocessor, the LCD microprocessor and screen and the LED screen and LED microprocessor generally indicated in dashed line.

An alternative embodiment of the invention herein is shown in FIGS. 9–16 wherein a portable programmable sign 116 shown in FIGS. 9, 12, and 15 includes a housing 118 having opposed front and rear sides 120 and 122. respectively. Housing 118 includes a lower hand-grip portion 124 which is mounted transverse to an upper sign portion 126. Hand-grip portion 124 has a length L that is approximately 5 inches at a right angle to sign portion 126 and a width W that is approximately 2⅜ inches. Sign portion 126 has a sign width SW that is approximately 12 inches at right angles to hand-grip portion 124 and a sign height SH that is approximately 3 inches.

A miniaturized computer microprocessor 128 for processing data indicated in dashed line in FIG. 15 is mounted within housing 118, in particular in hand-grip portion 124. Alternatively, computer microprocessor 128 can be mounted in sign portion 126 (not shown). As shown in FIGS. 9, 12, and 15, a keyboard 130 is mounted on rear side 122 of hand-grip portion 124 and a miniaturized keyboard microprocessor 132 operatively connected with keyboard 130 is mounted within hand-grip portion 124. Keyboard 130 is preferably slightly smaller than a standard keyboard. Keyboard microprocessor 132 is for receiving input data from keyboard 130 and transmitting the data to computer microprocessor 132.

Figure 13:
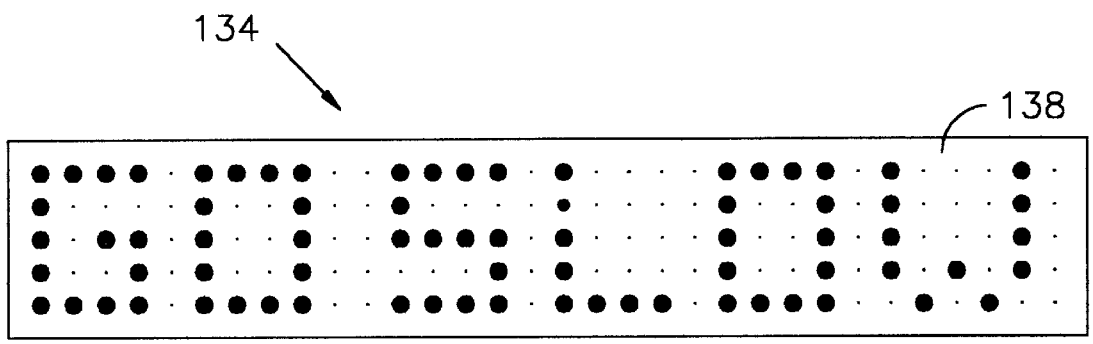
FIG. 13 is a view taken in isolation of the message screen in FIG. 11 illustrating in detail an LED display including indication of both activated and inactive light emitting diodes.
Figure 14:
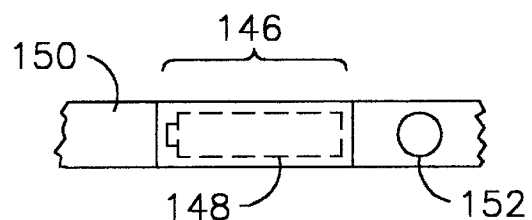
FIG. 14 is a view of the bottom side of the sign handle taken through line 14—14 in FIG. 11 showing both internal and external power sources.

A light-emitting message display 134 shown in FIGS. 11 and 13 presents the data entered at keyboard 130 in visual form to observers. Message display 134 is mounted at front side 120 of sign portion 126. A miniaturized message display microprocessor 136 mounted in sign portion 126 as indicated in dashed line in FIG. 15 converts the input data received from computer microprocessor 128 for entry at message display 134. Message display 134 is preferably an LED display 138 that transmits the color red. LED display 138 shown in FIG. 13 is presented on a 5×32 diode screen but such a configuration is shown for purposes of exposition only and will change in accordance with circumstances. A message 139 "GO SLOW" is shown by way of example as one of a number of possible messages. The screen size of LED display 138 is slightly smaller than the 12 inch by 3 inch dimensions of sign portion 126, which may be increased or decreased somewhat in accordance with circumstances and ease of handling sign 116 by a user. Actual size of LED display 138 varies in accordance with distances envisioned between the observer and sign 116 and environmental conditions such as night or day or whether the message is to be passed through a medium such as water, for example.

A monitor 140 shown in FIGS. 9 and 15 is mounted at rear side 122 of sign portion 126 of housing 118. Monitor 140 includes a miniaturized monitor microprocessor 142 and a monitor display 143 that is a liquid crystal display (LCD). Monitor 140 receives input data from computer microprocessor 128 entered at keyboard 130. Monitor display 143 enables a user to verify the accuracy of the input data being displayed prior to entry of the data for display at LED display 138.

Figure 16:
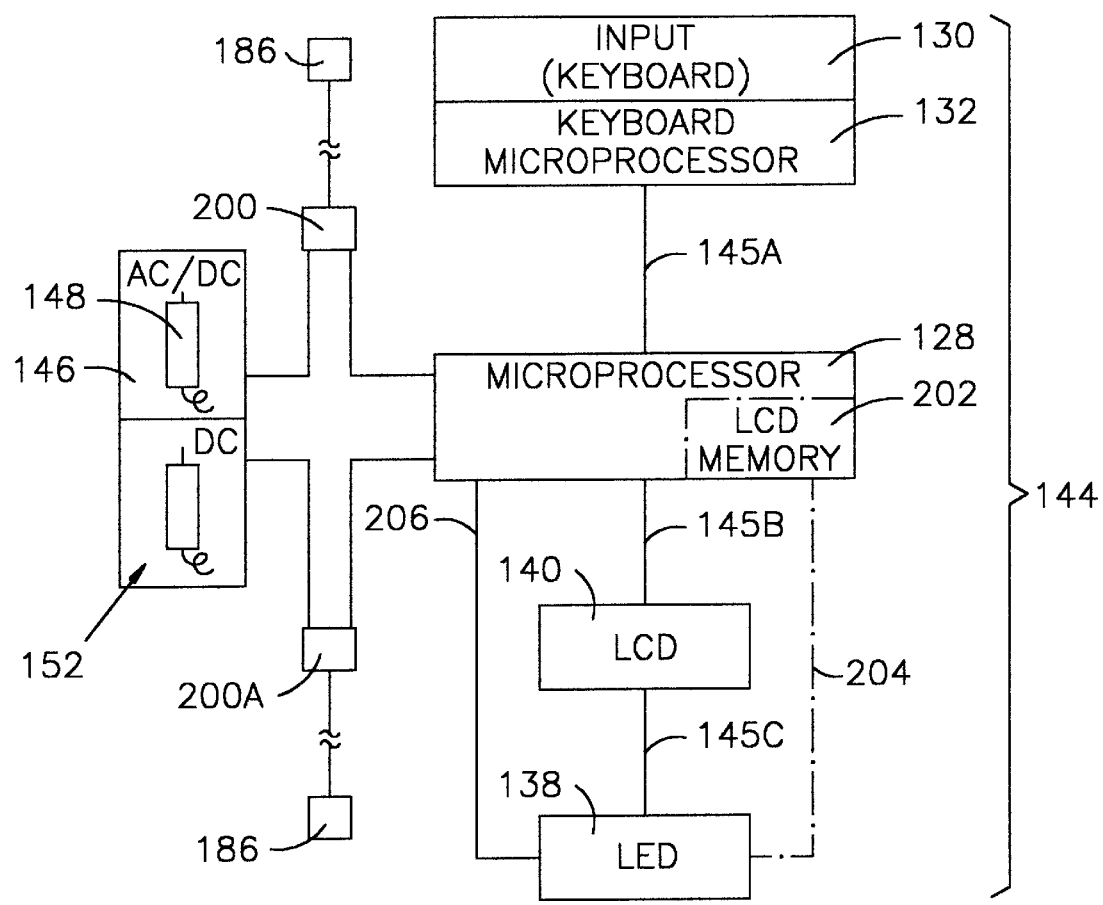
FIG. 16 is a simplified electrical diagram of the keyboard, the miniaturized microprocessor, the LED display assembly, the LCD monitor, power on/off switches, and alternative internal and external power sources.

An electrical circuit 144 that electrically joins keyboard 130 and keyboard microprocessor 132 with computer microprocessor 128 and message display microprocessor 136 and LED display 138 is shown in FIG. 16. Circuit 144 includes a circuit line 145A between keyboard microprocessor 132 and computer microprocessor 128, a circuit line 145B between computer microprocessor 128 and LCD 140, and a circuit line 145C between LCD 140 and LED 138. monitor display 143. A self-contained internal power source 146 that comprises a pair of batteries 148 at supplies electrical current to circuit 144 is mounted at the base 150 of hand-grip portion 124. Alternatively, an external power source indicated as a power connector 152 including an AC/DC converter positioned in base 150 can be utilized by connection to an external power line.

Figure 10:
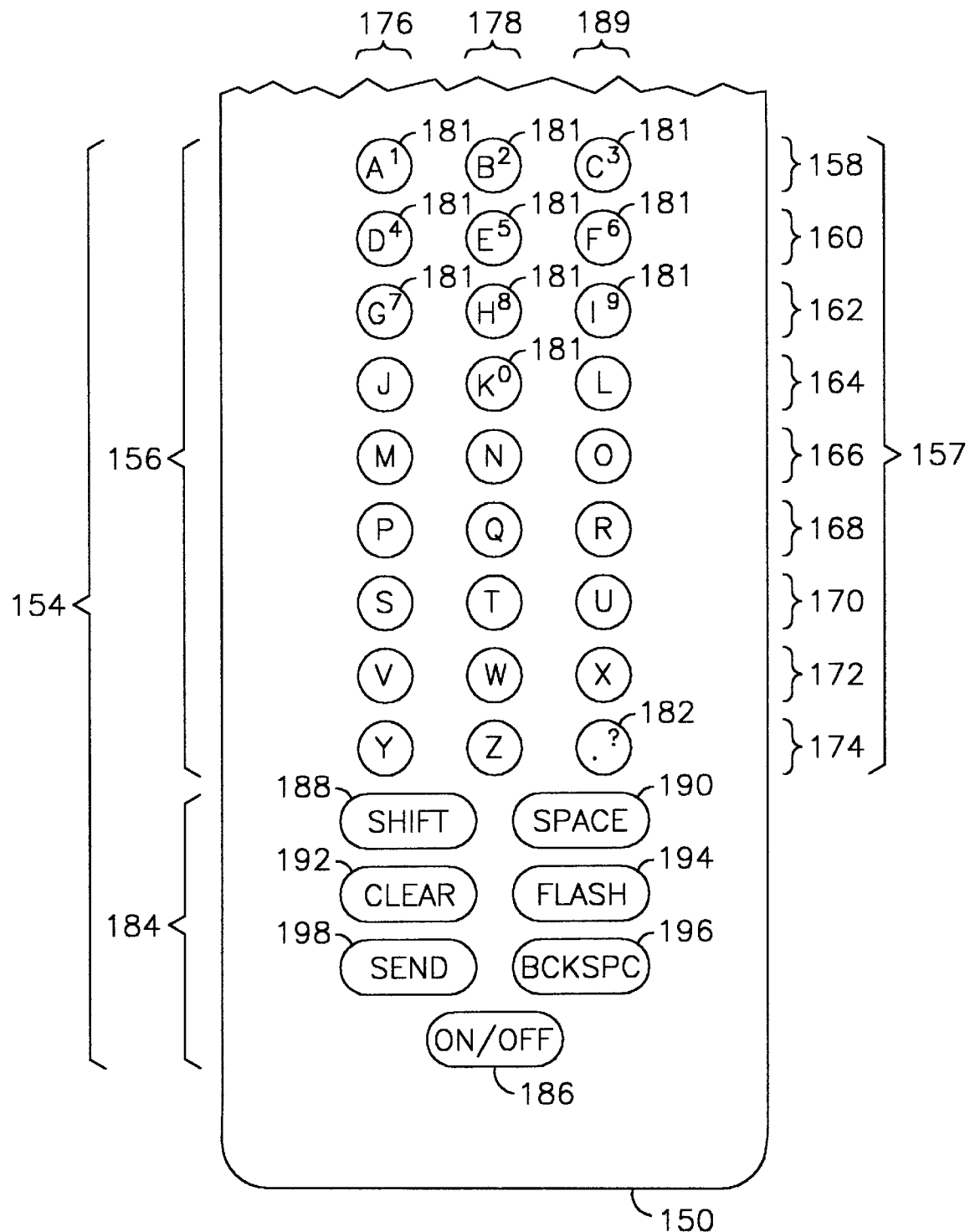
FIG. 10 is a view in isolation of the handle portion of the sign shown in FIG. 9 including the keyboard.

As best seen in FIG. 10, keyboard 130 includes an assemblage of systematically arranged keys 154 that are preferably slightly reduced in size than the standard keys on keyboards but still sized to receive finger tips for keystroke operation. Keys 154 operatively representing the letters of the alphabet, ten numerals 0, 1, 2, 3, 4, 5, 6, 7, 8, and 9, and grammatical signs period and question mark, all generally indicated as indicia 156 arranged in nine rows 157, specifically rows first row 158, second row 160, third row 162, fourth row 164, fifth row 166, sixth row 168, seventh row 170, eighth row 172, and ninth row 174 indicated from top to bottom sequence, and three files, namely, first file 176, second file 178, and third file 180, indicated in left to right sequence. Indicia rows 158, 160, 162, 164, 166, 168, 170, and 174 are oriented in parallel with length L of hand-grip portion 124 with first row 158 being most proximate to sign portion 126. Indicia 156 of keys 154 are arranged with the commonly used sequence of letters of the alphabet, namely, A, B, C, D, E, F, G, H, I, J, K, L, M, N, O, P, Q, R, S, T, U, V, W, X, Y, Z, placed in sequence from top first row 158, first file 176 to the left with the letter A, and first row 158, second, or middle, file 178 with the letter B, and first row 158, third file from the left 180 with the letter C, and second row 160, first file 176 to the left with the letter D, and so on in sequence with the ninth row 174, third file 180 from the left devoid of alphabetic indicia. Indicia 156 representing the ten basic numerals 0 through 9 are indicated on certain keys 154 selected for dual alphabetic indicia and numeral indicia are as follows: A, B, C, D, E, F, G, H, I, K, which are each additionally marked with numerical indicia 181, namely, 1, 2, 3, 4, 5, 6, 7, 8, 9, 0, respectively. Keys 154 further include indicia 156 marked on one grammatical key 182 in ninth row 174, third file 180 with both a period and a question mark.

The arrangement of keys 154 and indicia 156 are shown and have been described relative to FIG. 10 in a three-column and a nine-row configuration ordered in accordance with the standard order of the English alphabet. Such a configuration is presented merely for purposes of exposition. For example, the arrangement of keys 154 and indicia 156 can alternately be in accordance with the traditional arrangement of keys on standard computer keyboards with keyboard length L of hand-grip portion 124 serving as the viewing and operating base. Additional grammatical signs can likewise be added in the spirit of the invention.

Keyboard 130 includes a set of seven control keys 184 positioned below key ninth row 174. Control keys 184 include an on/off key 186, a shift key 188, a space key 190, a clear key 192, a flash key 194, a backspace (indicated as "bckspc") key 196, and a send key 198.

On/off key 186 is mechanically connected either to a mechanical open/closed switch 200 or a mechanical open/closed switch 200A each of which is schematically set forth in FIG. 16. Open/closed switch 200 is movable between a closed position and an open position, wherein in the closed position switch 200 mechanically connects electrical circuit 144 with internal power source 146, specifically batteries 148, and wherein in the open position electrical circuit 144 is disconnected from internal power source 146. Alternative open/closed switch 200A is movable between a closed position and a open position, wherein in the closed position open/closed switch 200A mechanically connects electrical circuit 144 with external power connector 152, and wherein in the open position electrical circuit 144 is disconnected from external power connector 152. Open/closed switches 200 and 200A are suitable mechanical switches known in the art, for example, biasably operated or other analogous types of mechanical switches. Operation by keystroke of on/off key 186 activates switches 200 or 200A so as to place electrical circuit 144 in an electrically activate or inactivate mode.

Operation by keystroke of shift key 188 activates all of ten combined alphabet-numeral keys between an alphabet mode and a numeral mode and operatively activates the combined grammatical symbols 182 between the period mode and the question mark. Shift key 188 is operatively connected to keyboard microprocessor 132 for transmittal to computer microprocessor 128 for positioning selected alphabetic indicia or a selected numeral of a selected combined alphabet-numeral key or one of a pair of grammatical symbols as selected by a user into a mode for subsequent electrical transmittal to computer microprocessor 128 in response to a keystroke at the selected key.

Operation by keystroke of space key 190 signals computer microprocessor 128 to transmit an electrical signal by way of circuit line 145 to monitor microprocessor 142 to omit a data space on monitor LCD display 143 before the next keystroke operation on keyboard 130.

Operation by keystroke of clear key 192 signals computer microprocessor 128 to transmit an electrical signal by way of circuit line 145 to monitor display microprocessor 142 to remove all data from monitor LCD display 143.

Operation of backspace key 196 signals computer microprocessor 128 to transmit an electrical signal by way of circuit line 145 to monitor display microprocessor 142 to omit a data space on monitor LCD display 143.

An optional data memory chip 202, designated herein as LED memory 202 and shown in phantom line in FIG. 16 and associated with computer microprocessor 128, stores input data signaled from keyboard 130 and computer microprocessor 128 and releases the input data upon a signal received by keystroke operation of send key 198 on keyboard 130 for display at message display 134. LED memory 202 includes a switch transistor operable between on and off modes, wherein in the off mode input data is continually stored in LED memory 202, and in the on mode the input data stored in LED memory 202 is released for transmittal by way a circuit line 204 shown in phantom line between LED memory 202 and message display 134. The memory switch transistor of LED memory 202 defaults to the off mode upon release of the input data to message display 134 in readiness to receive the next input data from keyboard 130.

Operation by a keystroke of flash key 194 sends a signal by way a secondary circuit 206 from computer microprocessor 128 by circuit line 145C or by a secondary circuit line 206 to message LED display 138 to cause the input data message being display thereon to blink between light-emitting and non-light-emitting modes.

A glare shield 208 connected to sign portion 126 of housing 12 shown in FIGS. 11, 12, and 15 reduces rays from external light from reaching and interfering with light emission from message display 134. Sign portion 126 has a rectangular front wall 210 with opposed front wall upper and lower edges 212 and 214, respectively, and opposed front wall side edges 216. Glare shield 208 includes a rectangular shield top plate 218 transverse to and secured to front wall upper edge 212 and a pair of opposed triangular side plates 220 transverse to top plate 218 and secured to front wall side edges 216. Side plates 220 have side plate linear top edges 222 secured to shield top plate 218 and side plate linear side edges 224 secured to and coextensive with front wall side edges 216. Side plate bottom points 226 are secured to front wall lower edge 214.

Although the present invention has been described in some detail by way of illustration and example for purposes of clarity and understanding, it will, of course, be understood that various changes and modifications may be made in the form, details, and arrangements of the parts without departing from the scope of the invention as set forth in the following claims.

What is claimed is:

1. A portable programmable sign, comprising, in combination,
   a housing having opposed front and rear sides including a sign portion and a hand-grip portion mounted transverse to said sign portion,
   computer miniaturized microprocessor means for processing data mounted within said housing,
   keyboard means mounted in said hand-grip portion for receiving input data and transmitting the input data to said computer microprocessor means, said keyboard means including a keyboard miniaturized microprocessor,
   message display means for presenting the input data to an observer, said message display means including a message display mounted on said front side of said sign portion,
   circuit means for electrically joining said keyboard means, said computer microprocessor means and said message display means,
   power means for supplying electrical current to said circuit means, and
   on/off means for connecting and disconnecting said circuit means with and from said power means.

2. The sign according to claim 1, further including means for controlling the input data entered at said keyboard means for display at said message display.

3. The sign according to claim 2, wherein said message display means includes a miniaturized message display microprocessor for receiving input data from said computer microprocessor means and converting the input data for transmission to said message display, said message display microprocessor being mounted in said sign portion of said housing.

4. The sign according to claim 3, wherein said keyboard means further includes a keyboard having plurality of indicia keys mounted on said keyboard.

5. The sign in accordance with claim 2, wherein said message display is a light-emitting display, said light-emitting display being a light-emitting diode (LED) display.

6. The sign in accordance with claim 5, wherein said LED display transmits the color red.

7. The sign in accordance with claim 4, wherein said plurality of indicia keys include an assemblage of systematically arranged alphabet keys operatively representing the letters of the alphabet in accordance with alphabetic indicia marked on said keys.

8. The sign in accordance with claim 7, wherein said indicia keys further include ten numeral keys operatively representing the ten single numerals marked on said keys in accordance with numeral indicia from 0 through 9.

9. The sign in accordance with claim 8, wherein selected keys of said alphabet keys operatively represent in response to a keystroke both said ten numeral indicia and selected alphabetic indicia, said ten numeral indicia and selected alphabetic indicia being marked on said selected keys.

10. The sign in accordance with claim 9, wherein said indicia keys further include at least one grammatical symbol key operatively representing in response to a keystroke a first grammatical symbol marked on said at least one grammatical symbol key.

11. The sign in accordance with claim 10, wherein said at least one grammatical symbol key further operatively represents in response to a keystroke a second grammatical symbol, said at least one key being marked with said second grammatical symbol.

12. The sign in accordance with claim 9, wherein said means for controlling includes the input data entered at said selected keys of said alphabet keys operatively representing in response to a keystroke both selected numeral indicia and selected alphabetic indicia; and said indicia keys operatively representing in response to a keystroke said at least one and said second grammatical symbol marked on said grammatical symbol key.

13. The sign in accordance with claim 12, wherein said means for controlling includes a shift key mounted on said keyboard for operatively activating a switch in said computer microprocessor in response to a held keystroke any of said ten combined alphabet-numeral keys from an alphabet mode to a numeral mode and said grammatical symbol key from a first grammatical symbol mode to a second grammatical symbol mode in preparation for processing a subsequent keystroke of any one of the combined alphabetic and numerical indicia keys or the combined first and second grammatical symbol key.

14. The sign in accordance with claim 4, wherein said means for controlling includes a space key mounted on said keyboard signaling said computer microprocessor in response to keystroke to transmit an electrical signal by way of said computer microprocessor to said message display means to omit a space before the next keystroke on said keyboard means.

15. The sign in accordance with claim 4, wherein said means for controlling includes a clear key signaling said computer microprocessor in response to a keystroke to transmit an electrical signal to delete all data being displayed said message display means.

16. The sign in accordance with claim 4, wherein said means for controlling includes a flash key mounted on said keyboard signaling said computer microprocessor in response to a keystroke to transmit an electrical signal to cause data being display on said message display means to blink between light-emitting and non-light emitting modes.

17. The sign in accordance with claim 4, wherein said means for controlling includes a backspace key signaling said computer microprocessor in response to keystroke to transmit an electrical signal to delete one space of prior entered data being displayed on said message display.

18. The sign in accordance with claim 2, wherein said on/off means includes a mechanical open/closed switch positioned between said circuit means and said power means, and an on/off key mounted on said keyboard mechanically operating said open/closed switch between a closed position and an open position in response to keystroke, wherein in the closed position said open/closed switch electrically connects said circuit means and said power means and wherein in the open position said open/closed switch disconnects said circuit means from said power means, said open/closed switch being positioned between said circuit means and said power means.

19. The sign in accordance with claim 2, further including memory chip means for storing input data signaled from said keyboard means and for releasing the input data upon a signal received from said keyboard means for transmission by way of a said circuit means to said message display means for display, said memory chip means being associated with said computer microprocessor means, said memory chip means including an electronic memory chip switch transistor operable between on and off modes, wherein in the off mode the input data is stored in said memory chip means without being signaled to said message display means and in the on mode the input data is released from said memory chip for signaling for display at said memory display means, said switch transistor returning to said off mode upon release of the input data.

20. The sign in accordance with claim 18, wherein said means for controlling includes a send key mounted on said keyboard signaling to said computer microprocessor in response to a keystroke to signal to said memory chip switch transistor to activate from the off mode to the on mode, wherein input data stored in said memory chip means is released for transmittal for display at said message display means, said memory transistor chip returning to said off mode upon release of the input data.

21. The sign in accordance with claim 1, wherein said computer microprocessor means is mounted within said hand-grip portion of said housing.

22. The sign in accordance with claim 1, wherein said computer microprocessor means is mounted within said sign portion of said housing.

23. The sign in accordance with claim 4, wherein said keyboard is mounted on said rear side of said hand-grip portion of said housing.

24. The sign in accordance with claim 1, wherein said power means is positioned within said hand-grip portion of said housing.

25. The sign in accordance with claim 1, wherein said power means is an internal power source, said internal power source being a plurality of batteries positioned in said hand-grip portion of said housing.

26. The sign in accordance with claim 1, wherein said power means includes a power connector and an AC/DC converter positioned in said housing connected to an external power source.

27. The sign in accordance with claim 1, further including means for preventing glare of external light from interfering with light emission from said message display means, said means for preventing being connected to said sign portion of said housing.

28. The sign in accordance with claim 1, wherein said sign portion has a rectangular front wall with opposed wall upper and lower edges and opposed wall side edges, and wherein said means for preventing includes a rectangular top plate transverse to and secured to said front wall at said wall upper edge and a pair of opposed triangular side plates transverse to said top plate and to said front wall and secured to said front wall at said wall side edges, said side plates having linear plate top edges secured to said top plate and linear plate side edges secured to said front wall at said wall side edges with side plate bottom points secured to said front wall at said wall lower edge.

29. A portable programmable sign, comprising, in combination,
 a housing having opposed front and rear sides including a sign portion and a hand-grip portion mounted transverse to said sign portion,
 computer miniaturized microprocessor means for processing data mounted within said housing,
 keyboard means mounted in said hand-grip portion for receiving input data and transmitting the input data to said computer microprocessor means, said keyboard means including a keyboard miniaturized microprocessor,
 message display means for presenting the input data to an observer, said message display means including a message display mounted on said front side of said sign portion,
 circuit means for electrically joining said computer means, said keyboard means and said message display means,
 power means for supplying electrical current to said circuit means, and
 on/off means for connecting and disconnecting said circuit means with and from said power means.

30. The sign according to claim 29, further including means for controlling the input data entered at said keyboard means for display at said message means.

31. The sign according to claim 29, wherein said message display means includes a miniaturized message display microprocessor for receiving input data from said computer microprocessor means and converting the input data for transmission to said message display, said message display microprocessor being mounted in said sign portion of said housing.

32. The sign according to claim 30, wherein said message display is a light-emitting display, said light-emitting display being a light-emitting diode (LED) display.

33. The sign according to claim 30, further including monitor display means for receiving the input data from said computer microprocessor means prior to transmission of the input data to said message means and for displaying the data on a monitor display to a user at said rear side of said sign portion of said housing for editing and verification of the input data by the user prior to the data being transmitted to said message means, said monitor display means being mounted within said housing and said monitor display being mounted on said rear side of said sign portion of said housing, said circuit means being also for electrically connecting said keyboard means and said computer microprocessor with said monitor means.

34. The sign in accordance with claim 33, wherein said monitor display means includes a miniaturized monitor microprocessor for receiving the input data entered at said keyboard means for displaying the input data prior to transmission of the input data to said message display microprocessor means and subsequent display of the data at said message display.

35. The sign in accordance with claim 34, wherein said monitor display is a liquid crystal display (LCD).

36. The sign in accordance with claim 33, wherein said keyboard means includes a plurality of systematically arranged indicia keys operatively representing at least the letters of the alphabet in accordance with alphabetic indicia and the ten basic numerals marked on said indicia keys, each of said plurality of indicia keys transmitting to said computer microprocessor a selected letter or numeral in response to a keystroke on the corresponding indicia key.

37. The sign in accordance with claim 36, wherein said plurality of indicia keys further include at least one key operatively representing at least one grammatical symbol for transmittal to said computer microprocessor in response to a keystroke.

38. The sign in accordance with claim 37, wherein said at least one grammatical symbol is two grammatical symbols.

39. The sign in accordance with claim 29, wherein said on/off means includes a mechanical open/closed switch positioned between said circuit means and said power means, and an on/off key mounted on said keyboard mechanically operating said open/closed switch between a closed position and an open position in response to keystroke, wherein in the closed position said open/closed switch electrically connects said circuit means and said power means and wherein in the open position said open/closed switch disconnects said circuit means from said power means, said open/closed switch being positioned between said circuit means and said power means.

40. The sign in accordance with claim 39, further including memory means for storing the input data signaled from said keyboard means and for releasing the input data upon a signal received from said keyboard means for transmission by way of a said circuit means to said monitor display means for display, said memory means being associated with said computer microprocessor means, said memory means including an electronic memory switch transistor operable between on and off modes, wherein in the off mode the input data is stored in said memory means and in the on mode the input data is released from said memory means for signaling for display at said message display means, said memory switch transistor returning to said off mode upon release of the input data.

41. The sign in accordance with claim 30, wherein said means for controlling includes a send key mounted on said keyboard signaling to said computer microprocessor in response to a keystroke to signal said memory chip switch transistor to activate from the off mode to the on mode, wherein input data stored in said memory chip means is released for transmittal for display at said message display means, said memory chip transistor returning to said off mode upon release of the input data, said send key means being also for signaling said computer microprocessor to signal activation of said message display means to a light-emitting mode.

42. The sign in accordance with claim 30, wherein said means for controlling includes a space key mounted on said keyboard signaling said computer microprocessor in response to keystroke to transmit an electrical signal by way of said computer microprocessor to said monitor display means to omit a space before the next keystroke on said keyboard.

43. The sign in accordance with claim 30, wherein said means for controlling includes a clear key mounted on said keyboard for signaling said computer microprocessor in response to keystroke to transmit an electrical signal to delete all data being displayed said monitor display.

44. The sign in accordance with claim 30, wherein said means for controlling includes a backspace key signaling said computer microprocessor in response to a keystroke to transmit an electrical signal to delete one space of prior entered data being displayed on said monitor display means.

45. The sign in accordance with claim 30, wherein said means for controlling includes a flash key signaling said computer microprocessor in response to a keystroke to transmit an electrical signal to cause data being displayed on said message display to blink between light-emitting and non-light emitting modes.

46. The sign in accordance with claim 38, wherein said means for controlling includes certain indicia keys operatively representing a combined letter of the alphabet and a numeral from 0 to 9, said means for controlling including a shift key operatively activating a mechanical switch in said computer microprocessor in response to a held keystroke of said shift key to activate said computer microprocessor from an alphabet mode to a numeral mode and from one of said two grammatical symbols to the other of said two grammatical symbols in preparation for processing a subsequent keystroke of any one of the combined alphabetic and numerical keys or the combined two grammatical symbols key.

47. The sign in accordance with claim 29, further including means for preventing glare of external light from interfering with light emission from said message display means, said means for preventing being connected to said sign portion of said housing.

48. The sign according to claim 29, wherein said power means is a battery power source, said battery power source is positioned in said housing.

* * * * *